(12) United States Patent
He et al.

(10) Patent No.: US 8,254,686 B2
(45) Date of Patent: Aug. 28, 2012

(54) ON-LINE IDENTIFYING METHOD OF HAND-WRITTEN ARABIC LETTER

(75) Inventors: Jiaming He, Ningbo (CN); Jianfen Wen, Ningbo (CN); Dexiang Jia, Ningbo (CN); Jing Chen, Ningbo (CN); Ping Chen, Ningbo (CN); Chengchen Ma, Ningbo (CN); Zhouyi Fan, Ningbo (CN); Hongzhen Ding, Ningbo (CN); Zhihui Shi, Ningbo (CN); Aijun Shi, Ningbo (CN); Linghui Fan, Ningbo (CN)

(73) Assignee: Ningbo Sunrun Elec. & Info. St & D Co., Ltd., Ningbo, Zhejiang Province (CN)

( * ) Notice: Subject to any disclaimer, the term of this patent is extended or adjusted under 35 U.S.C. 154(b) by 889 days.

(21) Appl. No.: 12/276,284

(22) Filed: Nov. 21, 2008

(65) Prior Publication Data

US 2010/0080463 A1 Apr. 1, 2010

(30) Foreign Application Priority Data

Sep. 27, 2008 (CN) .......................... 2008 1 0121396

(51) Int. Cl.
*G06K 9/00* (2006.01)
*G06K 9/18* (2006.01)
*G06K 9/34* (2006.01)
*G06K 9/48* (2006.01)
*G06K 7/10* (2006.01)
*G06K 9/20* (2006.01)
*G09G 1/10* (2006.01)

(52) U.S. Cl. ........ 382/187; 382/114; 382/177; 382/186; 382/242; 382/321; 345/17

(58) Field of Classification Search ...................... 345/17
See application file for complete search history.

(56) References Cited

U.S. PATENT DOCUMENTS

| | | | | |
|---|---|---|---|---|
| 5,459,809 | A * | 10/1995 | Kim et al. ...................... | 382/160 |
| 7,302,099 | B2 * | 11/2007 | Zhang et al. ................... | 382/186 |
| 8,005,294 | B2 * | 8/2011 | Kundu et al. .................. | 382/159 |
| 8,077,973 | B2 * | 12/2011 | Dong ............................. | 382/186 |
| 8,150,159 | B2 * | 4/2012 | He et al. ......................... | 382/182 |
| 2008/0025610 | A1 * | 1/2008 | Abdulkader ................... | 382/185 |
| 2010/0128985 | A1 * | 5/2010 | El-Sana et al. ................ | 382/189 |

OTHER PUBLICATIONS

T.S. El-Sheikh, S.G. El-Taweel, Real-time arabic handwritten character recognition, Pattern Recognition, vol. 23, Issue 12, 1990, pp. 1323-1332.*

(Continued)

*Primary Examiner* — Anand Bhatnagar
*Assistant Examiner* — Nathan Bloom

(57) ABSTRACT

The present invention discloses an on-line identifying method of hand-written Arabic letter. The advantage of the present invention is that the multilayer coarse classification algorithm based on the local characteristic of Arabic letter fully utilize the various local characteristics of Arabic letter, obtain the first candidate letter aggregation matching with the inputted hand-written Arabic letter according to the first level coarse classification formed by the stroke number of letter, and then obtain the second candidate letter aggregation matching with inputted hand-written Arabic letter according to the other local characteristics and the first candidate letter aggregation. The application of the algorithm enables that the inputted hand-written Arabic letter only need to match with the standard letter stored in the predetermined letter library and the corresponding standard letters of the second candidate letter aggregation.

7 Claims, 7 Drawing Sheets

OTHER PUBLICATIONS

F. Biadsy, J. El-Sana, N. Habash. Online Arabic Handwriting Recognition Using Hidden Markov Models. International Workshop Frontiers in Handwriting Recognition, Oct. 2006, pp. 3278-3286.*

Farooq, F.; Venu Govindaraju; Perrone, M.; "Pre-processing methods for handwritten Arabic documents," Document Analysis and Recognition, 2005. Proceedings. Eighth International Conference on , vol., No., pp. 267-271 vol. 1, Aug. 29-Sep. 1, 2005.*

Liana M. Lorigo, Venu Govindaraju, "Offline Arabic Handwriting Recognition: A Survey," IEEE Transactions on Pattern Analysis and Machine Intelligence, pp. 712-724, May 2006.*

M. Khedher; G. Abandah.; "Arabic Character Recognition using Approximate Stroke Sequence", Arabic Language Resources and Evaluation—Status and Prospects, LREC2002, Las Palmas de Gran Canaria, Jun. 1, 2002.*

M. Kherallah, L. Haddad, A. Alimi, A. Mitiche, On-line handwritten digit recognition based on trajectory and velocity modeling, Pattern Recognition Letters, vol. 29, Issue 5, Apr. 1, 2008, pp. 580-594.*

M. Kherallah, F. Bouri, A.M. Alimi, On-line Arabic handwriting recognition system based on visual encoding and genetic algorithm, Engineering Applications of Artificial Intelligence, vol. 22, Issue 1, Feb. 2009, pp. 153-170, (Avaialbe Online Aug. 29, 2008 at Sciencedirect.com).*

R. Nopsuwanchai, Discriminative training methods and their applications to handwriting recognition, Nov. 2005, http://www.cl.cam.ac.uk/techreports/UCAM-CL-TR-652.pdf, University of Cambridge, Computer Laboratory, UCAM-CL-TR-652.*

A. Suliman, M. N. Sulaiman, M. Othman and R. Wirza, Chain Coding and Pre Processing Stages of Handwritten Character Image File, Electronic Journal of Computer Science and Information Technology (eJCSIT), vol. 2, No. 1, 2010.*

Suliman, Azizah; Shakil, Asma; Sulaiman, Md. Nasir; Othman, Mohamed; Wirza, Rahmita; , "Hybrid of HMM and Fuzzy Logic for handwritten character recognition," Information Technology, 2008. ITSim 2008. International Symposium on , vol. 2, No., pp. 1-7, Aug. 26-28, 2008.*

* cited by examiner

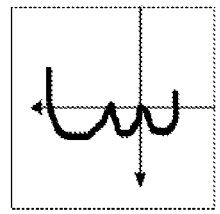
Fig.3
  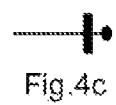 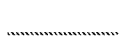 
Fig.4a    Fig.4b    Fig.4c    Fig.4d    Fig.4e
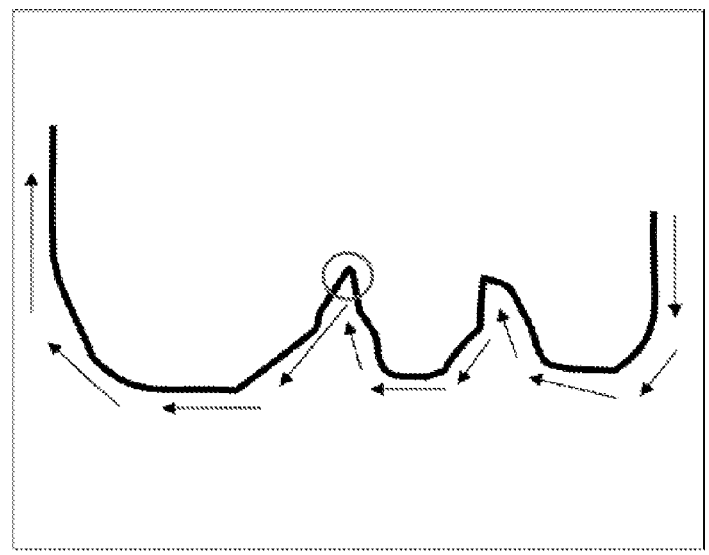
Fig.5

ON-LINE IDENTIFYING METHOD OF HAND-WRITTEN ARABIC LETTER

BACKGROUND OF THE PRESENT INVENTION

1. Field of Invention

The present invention relates to a method for identifying hand-written style, and more particularly to an on-line identifying method of hand-written Arabic letter.

2. Description of Related Arts

Arabic, as the language of Mohammedanism and <<Alcoran>>, is one of the primary languages of the world and is widely used in the world. Arabic letter is a written form of Arabic. At present, the research on identifying the Arabic letter has become one of the important researches.

An identifying method of printed Arabic letter based on boundary characteristic is disclosed in a Chinese patent application CN 101038627 an identifying method of printed Arabic letter based on boundary characteristic in Sep. 19, 2007. This method takes four boundaries of upside, downside, left and right of letters as a wave and expresses each boundary as an aggregation of a series of wave elements; then the boundary characteristics such as the number of the wave elements, the number of zero-line, the length of a first zero-line on the right boundary, the length of a first zero-line on the downside boundary, the length of a longest zero-line on the upside boundary, the length of a longest zero-line on the right boundary, the length of a longest zero-line on the downside boundary, and the number of positive-line on the upside boundary are extracted from the aggregations, and theses boundary characteristics combined with the depth-width ratio of letter and the depth-width ratio of an accessorial part of letter serve as identifying characteristic; at last, each printed Arabic letter is identified by four decision trees based on the four formats of letter: independence, beginning, middle and end respectively. This identifying method expresses the letter boundary as an aggregation of various wave elements, and extracts the characteristic of various wave elements from the aggregation. The extracting process is simple, fast and convenient. However, this identifying method is only effective to the printed Arabic letter, and is unstable to extract the characteristic of the hand-written Arabic letter. At the same time, the decision tree is not very adaptive to the deformation of the letter shape, which is a disadvantage to identify the hand-written Arabic letter. Furthermore, the deformation of the hand-written Arabic letter is very complex, so that the researches mainly concentrate on the identification of printed Arabic letter instead of the identification of hand-written Arabic letter.

SUMMARY OF THE PRESENT INVENTION

An object of the present invention is to provide an on-line identifying method of hand-written Arabic letter adopting a multilayer coarse classification algorithm based on a local characteristic of Arabic letter, so as to reduce a research range for identifying inputted hand-written Arabic letter, increase the identifying speed, and improving the identifying precision.

Accordingly, in order to accomplish the above object, the present invention provides an on-line identifying method of hand-written Arabic letter comprising following steps of:

(a) collecting the chirography coordinates of hand-written Arabic letter that are inputted in a terminal unit, and storing the collected chirography coordinates into a predefined structural array in real time;

(b) preprocessing the chirography coordinates and the chirography coordinates lattice in a matrix format transformed from the chirography coordinates stored in a structural array;

(c) by using the multilayer coarse classification algorithm based on the local characteristic of Arabic letter, according to shape characteristic of Arabic letter, classifying all standard Arabic letter into four categories, obtaining the first candidate letter aggregation matching with the inputted hand-written Arabic letter according to the stroke number of the inputted hand-written Arabic letter, and obtaining the second candidate letter aggregation matching with the inputted hand-written Arabic letter according to the local characteristic of the inputted hand-written Arabic letter and the first candidate letter aggregation; and (d) extracting a freeman chain code of inputted hand-written Arabic letter, calculating a matching probability between the freeman chain code of the inputted hand-written Arabic letter and the optimal Hidden Markov Models of each standard letter stored in a predetermined letter library and corresponding to each letter stored in the second candidate letter aggregation, obtaining an optimized matching probability from each matching probability, and determining that the standard letter stored in the predetermined letter library and corresponding to the optimized matching probability as the final identifying result of inputted hand-written Arabic letter.

Step (b) comprises the following steps of:

(b.1) smoothly filtering the chirography coordinates stored in the structural array, removing hardware noise, and eliminating burr and broken line formed in writing process;

(b.2) linearly and nonlinearly normalizing the chirography coordinate point lattice in the matrix format transformed from the chirography coordinates processed in step (b.1) by using linear normalization and non-linear normalization algorithm of on-line single-point width hand-written style to obtain a new chirography coordinate point lattice; and (b.3) adding points to the new chirography coordinate point lattice processed by step (b.2) to prevent from loosing effective characteristic point.

Step (b.2) comprises steps of:

(b.2.1) linearly normalizing the chirography coordinate point lattice in the matrix format transformed from the chirography coordinates processed in step (b.1) to a standard coordinate point lattice by adopting coordinates frame scaling and direct projection method;

(b.2.2) expressing the standard coordinate point of the standard coordinate point lattice as (x, y), and classifying the standard coordinate point (x, y) into the chirography coordinate point and the non-chirography coordinate point;

(b.2.3) calculating the density function d(x, y) of the standard coordinate point (x, y), $$d(x, y) = \begin{cases} \text{Max}(A/Lx, A/Ly), & Lx + Ly \pi 6A \\ 0, & Lx + Ly \geq 6A \end{cases},$$

wherein, Lx is a transverse density of the current standard coordinate point, Ly is a vertical density of the current standard coordinate point, A is a length of the standard coordinate point lattice, and the value of A is 64;

(b.2.4) calculating a level density projection function H(x) and a vertical density projection function V(y) of the standard coordinate point (x, y) according to the density function d(x, y) of the standard coordinate point (x,y), $$H(x) = \sum_{y=1}^{J} [d(x, y) + a_H], \ V(y) = \sum_{x=1}^{I} [d(x, y) + a_v],$$

wherein, d(x, y) is the density function of the standard coordinate point (x, y), I×J is a dimension of the standard coordinate point lattice, the value of I×J is 64×64, $a_H$ and $a_v$ are correction coefficient, and both value of $a_H$ and $a_v$ are 0.1;

(b.2.5) non-linearly normalizing the chirography coordinate point lattice by using the level density projection function H(x) and the vertical density projection function V(y) to obtain new chirography coordinate point lattice, $$m = \sum_{x=1}^{i} H(x) \times \frac{M}{\sum_{x=1}^{I} H(x)}, \ n = \sum_{y=1}^{j} V(y) \times \frac{N}{\sum_{y=1}^{J} V(y)},$$

wherein I×J is the dimension of the standard coordinate point lattice, the value of I×J is 64×64; M×N is a dimension of the new chirography coordinate point lattice processed by non-linear normalization, the predetermined value of M×N is 64×64; (m, n) is a coordinate point of the new chirography coordinate point lattice; i=1,2, ..., I, j=1,2, ..., J.

In step (c), the local characteristic comprises the stroke number of letter, the stroke segment number of letter, the vertical cross number of letter, the transverse cross number of letter, the existence of the point stroke in letter, the number of the point stroke and the position of the point stroke.

Step (c) comprises the following steps of:

(c.1) classifying all standard Arabic letter into four categories, case1, case2, case3 and case4, wherein case1 comprises the letters of one stroke, case2 comprises the letters of two strokes, case3 comprises the letters of three strokes, and case4 comprises the letters of four strokes, and directly obtaining the first candidate letter aggregation matching with inputted hand-written Arabic letter according to the stroke number of inputted hand-written Arabic letter;

(c.2) when the first candidate letter aggregation fits into case1, segmenting the inputted hand-written Arabic; when the stroke segment number is 1, obtaining the second candidate letter aggregation matching with the inputted hand-written Arabic letter; when the stroke segment number is more than 1, calculating the vertical cross number of the inputted hand-written Arabic letter; when S=1 or S=2, calculating the transverse cross number H of the inputted hand-written Arabic letter, and obtaining the second candidate letter aggregation matching with the inputted hand-written Arabic letter according to the transverse cross number H; when S=3, obtaining the second candidate letter aggregation matching with the inputted hand-written Arabic letter according to a direction of last stroke of the inputted hand-written Arabic letter; when S=4, directly obtaining the second candidate letter aggregation matching with the inputted hand-written Arabic letter; when the first candidate letter aggregation fits into case2, judging whether the point stroke exists in the inputted hand-written Arabic letter; wherein if the point stroke exists, when point stroke number is 1, according to the position of the point stroke located on upside, downside and inner side of the inputted hand-written Arabic letter, respectively obtaining the second candidate letter aggregation matching with the inputted hand-written Arabic letter; when the point stroke number is 2, directly obtaining the second candidate letter aggregation matching with the inputted hand-written Arabic letter; if the point stroke number does not exist, according to whether the inputted hand-written Arabic letter is an up-down structure, respectively obtaining the second candidate letter aggregation matching with the inputted hand-written Arabic letter; when the first candidate letter aggregation fits into case3, judging whether the head of the strokes except point stroke connects its tail of the inputted hand-written Arabic letter, if head connects to tail, directly obtaining the second candidate letter aggregation matching with the inputted hand-written Arabic letter; if head does not connect to tail, judging the position of point stroke; if the point stroke is above the inputted hand-written Arabic letter, calculating the vertical cross number S of the inputted hand-written Arabic letter; when S=1 or S=2, calculating the transverse cross number H of the inputted hand-written Arabic letter, and obtaining the second candidate letter aggregation matching with the inputted hand-written Arabic letter according to the transverse cross number H; when S=3, obtaining the second candidate letter aggregation matching with the inputted hand-written Arabic letter according to the direction of the last stroke of the inputted hand-written Arabic letter; when S=4, directly obtaining the second candidate letter aggregation matching with the inputted hand-written Arabic letter; if the point stock is under the inputted hand-written Arabic letter, directly obtaining the second candidate letter aggregation matching with the inputted hand-written Arabic letter; when the first candidate letter aggregation fits into case4, calculating the transverse cross number H of the strokes except the point stroke in the inputted hand-written Arabic letter; when the transverse cross number H is more than or equal to 3, directly obtaining the second candidate letter aggregation matching with the inputted hand-written Arabic letter; when the transverse cross number H is less than 3, directly obtaining the second candidate letter aggregation matching with the inputted hand-written Arabic letter.

The segmenting process in step (c.2) comprises steps of defining the new chirography coordinate point representing the beginning of a first stroke of the inputted hand-written Arabic letter in the new chirography coordinate point lattice processed by step (c) as a current chirography coordinate point; judging whether an angle between the current chirography coordinate point and a new chirography coordinate points next to the current chirography coordinate point is larger than a predetermined threshold value, wherein when the angle is larger than the predetermined threshold value, the current chirography coordinate point is a preliminary turning point; processing the next new chirography coordinate point in a same manner to obtain all preliminary turning points; defining all processed preliminary turning points of all preliminary turning points as current preliminary turning points, and deleting a preliminary turning point closer to the current preliminary turning point between two preliminary turning points adjacent to the current preliminary turning point; obtaining all optimized turning points until all preliminary turning points are processed; segmenting the inputted hand-written Arabic letter according to the optimized turning points to obtain the stroke segments.

Step (d) comprises the following steps of: (d.1) extracting the freeman chain code of the inputted hand-written Arabic letter; (d.2) calculating the matching probability between the freeman chain code of the inputted hand-written Arabic letter and the optimal Hidden Markov Models of each standard letter stored in a predetermined letter library and corresponding to each letter stored in the second candidate letter aggregation by using Viterbi Algorithm; (d.3) obtaining the maximum matching probability by sequencing each matching probability by using public Bubble Sort Algorithm; (d.4)

determining the standard letter stored in the predetermined letter library and corresponding to the optimized matching probability as the final identifying result of Arabic letter.

Comparing with the prior art, the advantage of the present invention is that the multilayer coarse classification algorithm based on the local characteristic of Arabic letter fully utilize the various local characteristics of Arabic letter, obtain the first candidate letter aggregation matching with the inputted hand-written Arabic letter according to the first level coarse classification formed by the stroke number of letter, and then obtain the second candidate letter aggregation matching with inputted hand-written Arabic letter according to the other local characteristics and the first candidate letter aggregation. The application of the algorithm enables that the inputted hand-written Arabic letter only need to match with the standard letter stored in the predetermined letter library and the corresponding standard letters of the second candidate letter aggregation. Comparing to matching the inputted hand-written Arabic letter with the corresponding standard letter stored in the predetermined letter library, the application of the algorithm effectively reduces the search range of the inputted hand-written Arabic letter, and increases the matching speed and the identifying precision. During the pre-process, a linear normalization and non-linear normalization of on-line single-point width hand-written style is provided, wherein the linear normalization not only reduces the computation of the subsequent nonlinear normalization process but also increases the feasibility of the nonlinear normalization process. The nonlinear normalization effectively corrects the local deformation of the inputted hand-written Arabic letter to ensure the accuracy of the following multilayer coarse classification algorithm. Besides, the identifying method of the present invention is stable, adaptive and easy-to-achieve.

BRIEF DESCRIPTION OF THE DRAWINGS

FIG. 3 is a schematic view of Arabic letter, illustrating the hand-written direction.

FIG. 4a is schematic view of determining a first value of the transverse density Lx.

FIG. 4b is schematic view of determining a second value of the transverse density Lx.

FIG. 4c is schematic view of determining a third value of the transverse density Lx.

FIG. 4d is schematic view of determining a fourth value of the transverse density Lx.

FIG. 4e is schematic view of determining a fifth value of the transverse density Lx.

FIG. 5 is a schematic view of hand-written chirography of the first Arabic letter.

DETAILED DESCRIPTION OF THE PREFERRED EMBODIMENT

Figure 1:
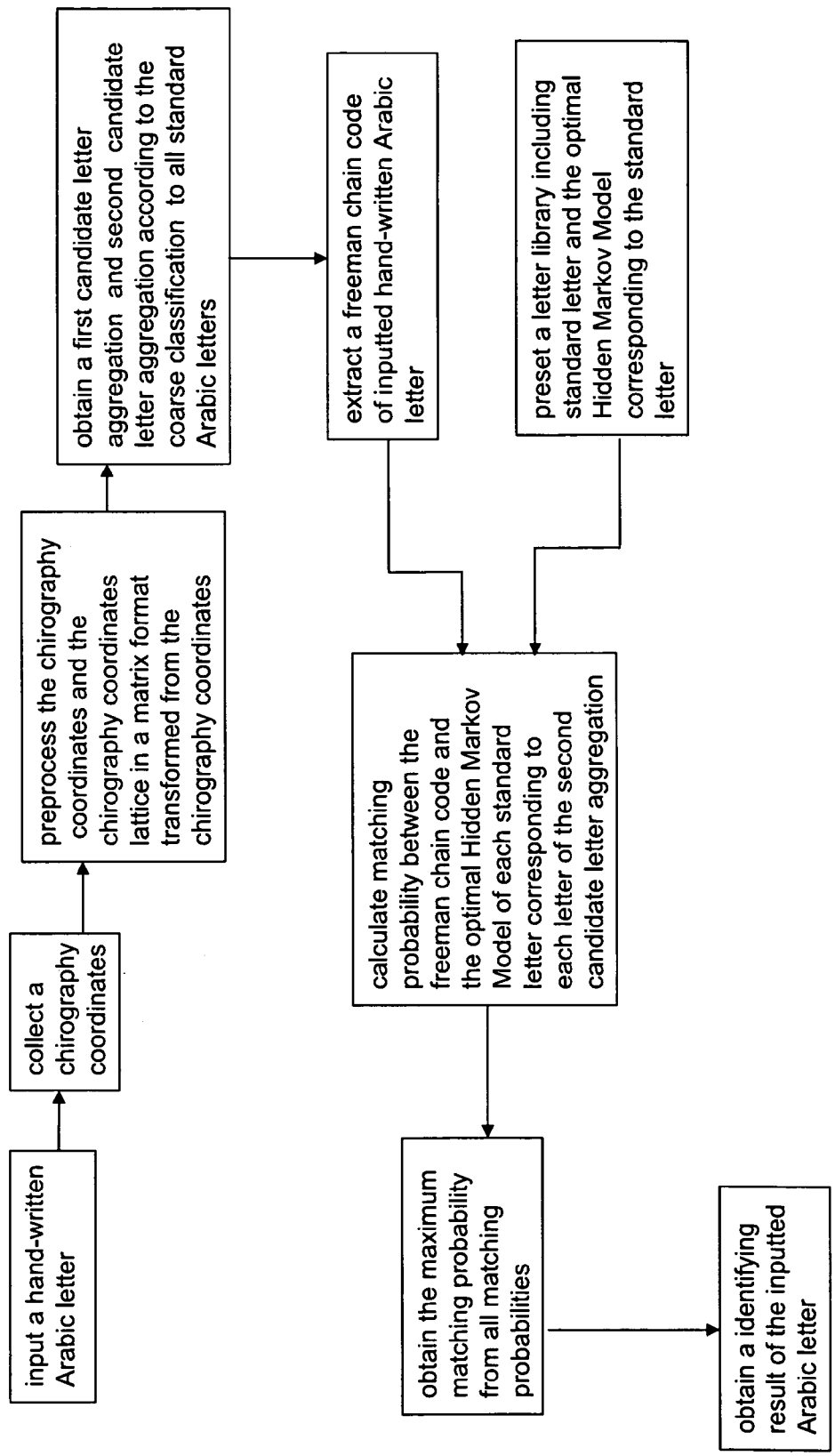
FIG. 1 is a flow chart of the present invention.

Referring to the drawings, the present invention is further described in detail as follows.

First, the standard Arabic letter library pre-stored in a terminal unit is described.

The Arabic letter library comprises 28 standard Arabic letters and an optimal Hidden Markov Models corresponding to each standard Arabic letter. The obtaining process of the optimal Hidden Markov Models comprises the following steps.

Figure 6:
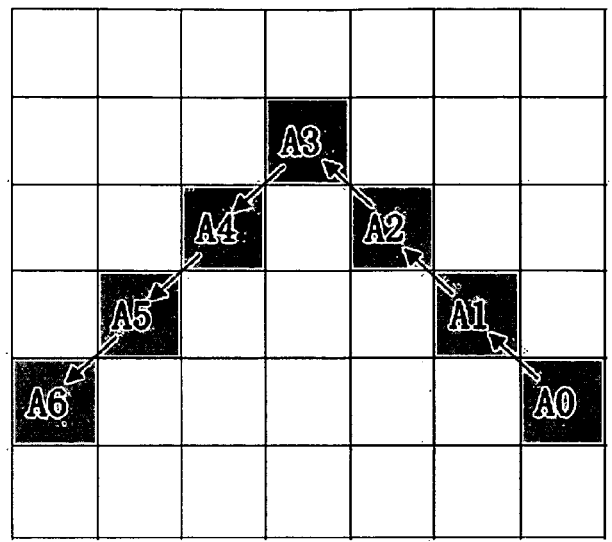
FIG. 6 is a schematic view of obtaining freeman chain code in the circled part of FIG. 5.
Figure 7:
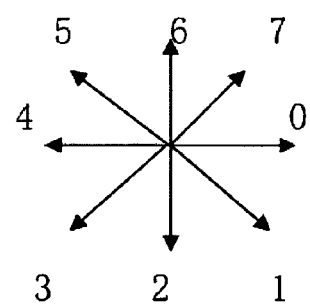
FIG. 7 is a schematic view illustrating the definition the eight-direction freeman chain code.

1) Write 28 Arabic letters by hand for one hundred times, and obtain eight-direction direction code of the coordinate points passed by the chirography of each Arabic letter according to the schematic view of the definition of eight-direction freeman chain code as shown in FIG. 7 according to hand-written chirography sequence of each time. The eight-direction direction code is the freeman chain code, and the freeman chain code has eight directions, 0, 1, 2, 3, 4, 5, 6 and 7. Thus, a string of freeman chain code is obtained by writing each Arabic letter by hand each time, and one hundred strings of corresponding freeman chain codes can be obtained by writing one Arabic letter by hand for one hundred times. The one hundred strings of the corresponding freeman chain codes of each Arabic letter are taken as one hundred samples of Arabic letter. For example, a process of obtaining freeman chain codes from the circled part shown in FIG. 5 comprises steps of: as shown in FIG. 6, provided that current calculated coordinate point is A3, obtaining that the direction code of the coordinate point A3 is 5 relative to the anterior coordinate point A2, obtaining that the direction code of the coordinate point A4 is 3 relative to the coordinate point A3, and further obtaining the direction codes of other coordinate point one by one, so as to obtain the freeman chain codes of the circled part shown in FIG. 5.

2) Input the samples into the primary Hidden Markov Models for being trained, so as to obtain the optimal Hidden Markov Models, which comprise the following steps. First, determine the state number L and the number of observed value G, and initialize the model parameters of the primary Hidden Markov Models in an equiprobability manner. Because the freeman chain code has eight values: 1, 2, 3, 4, 5, 6 and 7, G=8 and L=10 in the preferred embodiment. L generally is valued between 0 and 20. Theoretically, the higher L is, the more precise the optimal Hidden Markov Models is. However, too high value of L will not only increase the calculation complexity, but also demand a higher CPU of the terminal unit. Second, take the sample obtained in step 1) as the observed value sequence of the primary Hidden Markov Models, and optimize the model parameters of the primary Hidden Markov Model by using Baum-Welch Iterative Re-evaluation Algorithm, so as to finally obtain the optimal Hidden Markov Model.

The Baum-Welch Iterative Re-evaluation Algorithm of the step 2) is the local optimized algorithm based on the steepest gradient descent. It is very easy to obtain a local optimized solution while estimating the parameters, so that the Baum-Welch Iterative Re-evaluation Algorithm can not ensure to obtain a global maximal point. The convergent point may be a local maximal point. In order to obtain the global maximal point, optimize the model parameters of the primary Hidden Markov Model by using global optimized algorithm based on stochastic relaxationdiscrete Hidden Markov parameters, so as to finally obtain the optimal Hidden Markov Model.

Based on the standard Arabic letter library, an on-line identifying method of hand-written Arabic letter of the present invention, as shown in FIG. 1, comprises the following steps.

(a) Collect the chirography coordinates of hand-written Arabic letter (to be identified) that are inputted in a terminal unit, and store the collected chirography coordinates into a predefined structural array in real time. In this embodiment, the terminal unit can be mobile phone, PDA (Personal Digital Assistant), or other digital terminal products, wherein the terminal unit has an inputted frame with coordinates of 192× 192 lattice.

(b) Preprocess the chirography coordinates and the chirography coordinates lattice in a matrix format transformed from the chirography coordinates stored in a structural array, the preprocessing process comprises the following steps.

(b.1) Smoothly filter the chirography coordinates stored in the structural array, remove hardware noise, and eliminate burr and broken line formed in writing process. In this embodiment, smoothly filtering, hardware noise removing and burr and broken line eliminating formed in writing process are processed by using prior art.

(b.2) Correct the local deformation of the hand-written letters by using linear normalization and non-linear normalization of on-line single-point width hand-written style, because the hand-written Arabic letter has various deformation comparing to the standard Arabic letter, which greatly effect the later process.

The algorithm linearly and nonlinearly normalizes the chirography coordinate point lattice in the matrix format transformed from the chirography coordinates processed in step (b.1), and obtains new chirography coordinate point lattice so as to correct the local deformation of the hand-written letters. The algorithm comprises the following steps.

(b.2.1) Linearly normalize the chirography coordinate point lattice in the matrix format transformed from the chirography coordinates process in step (b.1) to a 64×64 standard coordinate point lattice by adopting coordinates frame scaling and direct projection method so as to reduce the computation of the subsequent nonlinear normalization process and increase the feasibility of the nonlinear normalization process.

(b.2.2) Express the standard coordinate point of the standard coordinate point lattice as (x, y), and classify the standard coordinate point (x, y) into the chirography coordinate point and the non-chirography coordinate point. The non-chirography coordinate point is an area of no chirography. The existence of the chirography beside the non-chirography coordinate point comprises the following conditions. there is no chirography either on the left or right; there is chirography on the left and no chirography on the right; there is chirography on both the left and right. The chirography coordinate point is on the chirography. The existence of the chirography beside the chirography coordinate point comprises the following conditions: there is no chirography either on the left or right; there is chirography on the left and no chirography on the right; there is no chirography on the left and chirography on the right. One stroke is defined from the fall to the lift of the pen.

(b.2.3) Calculate the density function d(x, y) of the standard coordinate point (x,y), $$d(x, y) = \begin{cases} \text{Max}(A/Lx, A/Ly), & Lx + Ly \neq 6A \\ 0, & Lx + Ly \geq 6A \end{cases},$$

wherein, Lx is a transverse density of the current standard coordinate point, Ly is a vertical density of the current standard coordinate point, A is a length of the standard coordinate point lattice, and the value of A is 64.

(b.2.4) Calculate a level density projection function H(x) and a vertical density projection function V(y) of the standard coordinate point(x,y) according to the density function d(x,y) of the standard coordinate point (x,y), $$H(x) = \sum_{y=1}^{J} [d(x, y) + a_H], \quad V(y) = \sum_{x=1}^{I} [d(x, y) + a_v],$$

wherein, d(x, y) is the density function of the standard coordinate point(x,y), I×J is a dimension of the standard coordinate point lattice, the value of I×J is 64×64, $a_H$ and $a_v$ are correction coefficient, and both value of $a_H$ and $a_v$ are 0.1. The theoretical value of correction coefficient $a_H$ and $a_v$ is [0, 1]. The dimension of the correction coefficient $a_H$ and $a_v$ relates to the correction effect of the local deformation of the hand-written letter. When both $a_H$ and $a_v$ are 0.1, 0.125, 0.2, 0.58 and 0.8 respectively, experiments shows that the correction effect of the local deformation of the hand-written letter is optimal when both $a_H$ and $a_v$ are 0.1.

(b.2.5) Non-linearly normalize the chirography coordinate point lattice by using the level density projection function H(x) and the vertical density projection function V(y) to obtain new chirography coordinate point lattice, $$m = \sum_{x=1}^{i} H(x) \times \frac{M}{\sum_{x=1}^{I} H(x)}, \quad n = \sum_{y=1}^{j} V(y) \times \frac{N}{\sum_{y=1}^{J} V(y)},$$

wherein I×J is the dimension of the standard coordinate point lattice, the value of I×J is 64×64; M×N is a dimension of the new chirography coordinate point lattice processed by non-linear normalization, the predetermined value of M×N is 64×64; (m, n) is a coordinate point of the new chirography coordinate point lattice; i=1,2, . . . , I, j=1,2, . . . , J.

In this embodiment, the transverse density Lx and the vertical density Ly of the current standard coordinate point is obtained from the following method. As shown in FIG. 3, because the hand-written habit is from right to left and from upside to downside, the beginning of Lx is on the right and the beginning of Ly is on the upside. Lx has three different values. When the current standard coordinate point is at a position shown in FIGS. 4a and 4c, the value of Lx is the times of discrete chirography coordinate point passed by the horizontal line from the current standard coordinate point to the right +1. In this preferred embodiment, the times of the continuous chirography passed by the horizontal line to the right is taken as one time. When the current standard coordinate point is at the position shown in FIG. 4*b*, the value is 1. When the current standard coordinate point is at the position shown in FIG. 4*e*, the value is 2A. When the current standard coordinate point is non-chirography coordinate point, the value of Lx has tree different values. When the current standard coordinate point is at a position shown in FIGS. 4*a* and 4*c*, the value of Lx is the times of discrete chirography coordinate point passed by the horizontal line from the current standard coordinate point to the right. When the current standard coordinate point is at the position shown in FIG. 4*b*, the value is 2A. When the current standard coordinate point is at the position shown in FIG. 4*d*, the value is 4A. Wherein A is a length of the standard coordinate point lattice, and the value of A is 64. The value process of the vertical density Ly is the same with that of the vertical density Lx. As shown in FIG. 4*a* to 4*e*, "▮" represents the current standard coordinate point; "●" represents the point stroke.

(b.3) Add points to the new chirography coordinate point lattice processed by step (b.2) to prevent from loosing effective characteristic point. The adding operation adopts classical Bresenham Lineplotting Algorithm, and adds middle characteristic point between two adjacent standard coordinate points, when the distance of two adjacent standard coordinate point is larger than 1 in the new chirography coordinate point lattice.

Figure 2:
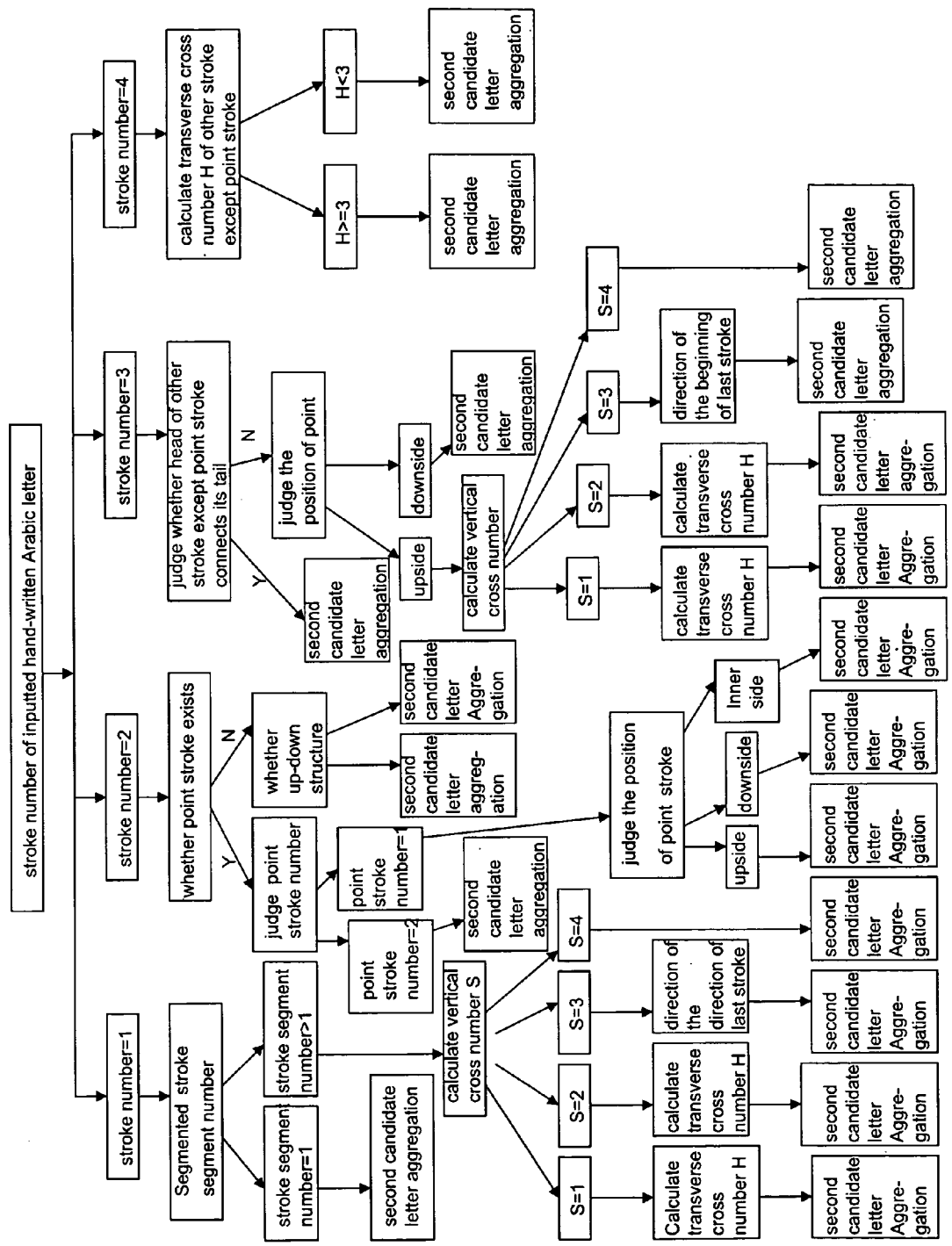
FIG. 2 is a flow chart of a multilayer coarse classification algorithm based on local characteristic of Arabic letter of the present invention.

(c) By using the multilayer coarse classification algorithm based on the local characteristic of Arabic letter, according to shape characteristic of Arabic letter, classify all standard Arabic letter into four categories, obtain the first candidate letter aggregation matching with the inputted hand-written Arabic letter according to the stroke number of the inputted hand-written Arabic letter, and obtain the second candidate letter aggregation matching with the inputted hand-written Arabic letter according to the local characteristic of the inputted hand-written Arabic letter and the first candidate letter aggregation. The local characteristic comprises the stroke number of letter, the stroke segment number of letter, the vertical cross number of letter, the transverse cross number of letter, the existence of the point stroke in letter, the number of the point stroke and the position of the point stroke and so on, wherein one stroke is defined from the fall to the lift of the pen. As shown in FIG. 2, the algorithm comprises the following steps.

(c.1) The first level coarse classification: classify all standard Arabic letter into four categories, case1, case2, case3 and case4, wherein case1 comprises the letters of one stroke, case2 comprises the letters of two strokes, case3 comprises the letters of three strokes, and case4 comprises the letters of four strokes, and directly obtain the first candidate letter aggregation matching with inputted hand-written Arabic letter according to the stroke number of inputted hand-written Arabic letter.

Figure 8A:
FIG. 8a is a schematic view of a point stroke being above the Arabic letter.
Figure 8B:
FIG. 8b is a schematic view of a point stroke being under the Arabic letter.
Figure 8C:
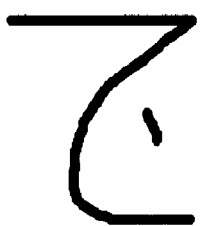
FIG. 8c is a schematic view of a point stroke being under the Arabic letter.
Figure 9:
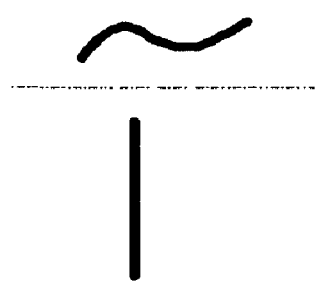
FIG. 9 is a schematic view of Arabic letter of up-down structure.
Figure 10A:
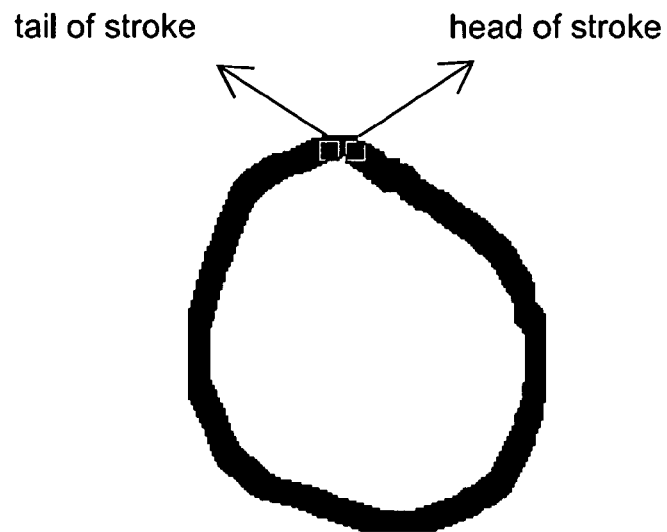
FIG. 10a is a schematic view of Arabic letter, wherein the head of the other stroke except the point stroke connects to its tail.
Figure 10B:
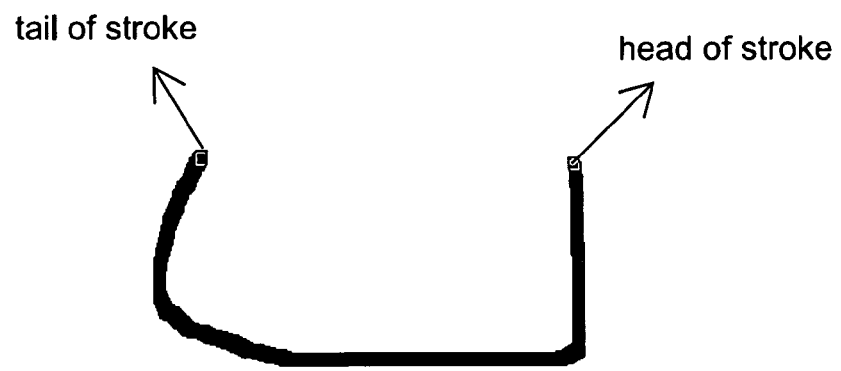
FIG. 10b is a schematic view of Arabic letter, wherein the head of the other stroke except the point stroke does not connect to its tail.

(c.2) The second level coarse classification: When the first candidate letter aggregation fits into case1, that is to say the stroke number of the inputted hand-written Arabic is 1, segment the inputted hand-written Arabic. When the stroke segment number is 1, obtain the second candidate letter aggregation matching with the inputted hand-written Arabic letter directly selected from the first candidate letter aggregation. When the stroke segment number is more than 1, calculate the vertical cross number of the inputted hand-written Arabic letter. When S=1 or S=2, calculate the transverse cross number H of the inputted hand-written Arabic letter, and obtain the second candidate letter aggregation matching with the inputted hand-written Arabic letter directly selected from the first candidate letter aggregation according to the transverse cross number H. When S=3, obtain the second candidate letter aggregation matching with the inputted hand-written Arabic letter from the first candidate letter aggregation according to a direction of last stroke of the inputted hand-written Arabic letter. When S=4, directly obtain the second candidate letter aggregation matching with the inputted hand-written Arabic letter from the first candidate letter aggregation. When the first candidate letter aggregation fits into case2, that is to say the stroke number of the inputted hand-written Arabic is 2, judge whether the point stroke exists in the inputted hand-written Arabic letter. If the point stroke exists, When point stroke number is 1, according to the position of the point stroke located on upside (as shown in FIG. 8*a*), downside (as shown in FIG. 8*a*) and inner side (as shown in FIG. 8*a*) of the inputted hand-written Arabic letter, respectively obtain the second candidate letter aggregation matching with the inputted hand-written Arabic letter from the first candidate letter aggregation. When the point stroke number is 2, directly obtain the second candidate letter aggregation matching with the inputted hand-written Arabic letter from the first candidate letter aggregation. If the point stroke number does not exist, according to whether the inputted hand-written Arabic letter is an up-down structure, respectively obtain the second candidate letter aggregation matching with the inputted hand-written Arabic letter from the first candidate letter aggregation. To judge the up-down structure of the hand-written Arabic letter, as shown in FIG. 9, if the dashed separates the letter into two independent parts in FIG. 9, the letter is called up-down structure. When the first candidate letter aggregation fits into case3, that is to say the stroke number of the inputted hand-written Arabic is 3, judge whether the head of the strokes except point stroke connects its tail of the inputted hand-written Arabic letter. If head connects to tail, as shown in FIG. 10*a*, directly obtain the second candidate letter aggregation matching with the inputted hand-written Arabic letter from the first candidate letter aggregation. If head does not connect to tail, as shown in FIG. 10*b*, judge the position of point stroke. If the point stroke is above the inputted hand-written Arabic letter, calculate the vertical cross number S of the inputted hand-written Arabic letter. When S=1 or S=2, calculate the transverse cross number H of the inputted hand-written Arabic letter, and obtain the second candidate letter aggregation matching with the inputted hand-written Arabic letter from the first candidate letter aggregation according to the transverse cross number H. When S=3, obtain the second candidate letter aggregation matching with the inputted hand-written Arabic letter from the first candidate letter aggregation according to the direction of the last stroke of the inputted hand-written Arabic letter. When S=4, directly obtain the second candidate letter aggregation matching with the inputted hand-written Arabic letter from the second candidate letter aggregation from the first candidate letter aggregation. If the point stock is under the inputted hand-written Arabic letter, directly obtain the second candidate letter aggregation matching with the inputted hand-written Arabic letter from the first candidate letter aggregation. When the first candidate letter aggregation fits into case4, that is to say the stroke number of the inputted hand-written Arabic is 4, calculate the transverse cross number H of the strokes except the point stroke in the inputted hand-written Arabic letter. When the transverse cross number H is more than or equal to 3, directly obtain the second candidate letter aggregation matching with the inputted hand-written Arabic letter from the first candidate letter aggregation. When the transverse cross number H is less than 3, directly obtain the second candidate letter aggregation matching with the inputted hand-written Arabic letter from the first candidate letter aggregation.

The application of the multilayer coarse classification algorithm based on the local characteristic of Arabic letter enables that the inputted hand-written Arabic letter only need to match with the standard letter stored in the predetermined letter library and the corresponding standard letters of the second candidate letter aggregation. Comparing to matching the inputted hand-written Arabic letter with the corresponding standard letter stored in the predetermined letter library, the application of the algorithm effectively reduces the search range of the inputted hand-written Arabic letter, and increases the matching speed and the identifying precision.

A specific process of segmenting the inputted hand-written Arabic letter in step (c.2) is illustrated as follows. Define the new chirography coordinate point representing the beginning of a first stroke of the inputted hand-written Arabic letter in the new chirography coordinate point lattice process by step (c) as a current chirography coordinate point. Judge whether an angle between the current chirography coordinate point and a new chirography coordinate points next to the current chirography coordinate point is larger than a predetermined threshold value. When the angle is larger than the predetermined threshold value, the current chirography coordinate point is a preliminary turning point. Process the next new chirography coordinate point in a same manner to obtain all preliminary turning points. Define all processed preliminary turning points of all preliminary turning points as current preliminary turning points, and delete a preliminary turning point closer to the current preliminary turning point between two preliminary turning points adjacent to the current preliminary turning point, wherein closer means that the vector distance between two preliminary turning points is less than or equal to 10. All optimized turning points are obtained, until all preliminary turning points are processed. Segment the inputted hand-written Arabic letter according to the optimized turning points to obtain the stroke segments. If the optimized turning point does not exist, only extract the new chirography coordinate point representing the beginning and end of the inputted hand-written Arabic letter from the new chirography coordinate point lattice, and make sure that the stroke segment number of the inputted hand-written Arabic letter is 1. The too big and small of the threshold value will easily results in wrong preliminary turning points. Generally, the threshold value is between 20° and 30°. The experiment shows that when the threshold value is 25°, the optimized preliminary turning point can be achieved. So in this preferred embodiment, define the threshold value as 25°.

(d) Extract a freeman chain code of inputted hand-written Arabic letter, calculate a matching probability between the freeman chain code of the inputted hand-written Arabic letter and the optimal Hidden Markov Models of each standard letter stored in a predetermined letter library and corresponding to each letter stored in the second candidate letter aggregation, obtain an optimized matching probability from each matching probability, and determine that the standard letter stored in the predetermined letter library and corresponding to the optimized matching probability as the final identifying result of inputted hand-written Arabic letter. Step (d) comprises the following steps. (d.1) extract the freeman chain code of the inputted hand-written Arabic letter; (d.2) calculate the matching probability between the freeman chain code of the inputted hand-written Arabic letter and the optimal Hidden Markov Models of each standard letter stored in a predetermined letter library and corresponding to each letter stored in the second candidate letter aggregation by using Viterbi Algorithm; (d.3) obtain the maximum matching probability by sequencing each matching probability by using public Bubble Sort Algorithm; (d.4) determine the standard letter stored in the predetermined letter library and corresponding to the optimized matching probability as the final identifying result of Arabic letter. The Viterbi Algorithm is used to calculate the matching probability of optimized matching path. The application of the Viterbi Algorithm greatly reduces the calculation speed and increases the matching speed of the inputted hand-written Arabic letter.

The process of obtaining the freeman chain code of the inputted hand-written Arabic letter comprises the following steps. Define the new chirography coordinate point representing the beginning of first stroke of the inputted hand-written Arabic letter as a trace point in the new chirography coordinate point lattice. Determine the value of the trace point according to the eight-direction definition of the freeman chain code. Process the next new chirography coordinate point as the trace point according to the hand-written sequence of the inputted hand-written Arabic letter, and obtain the freeman chain code of the inputted hand-written Arabic letter, until the last new chirography coordinate point is process. The eight-direction definition of the freeman chain code is shown in FIG. 7, the freeman chain code has eight values, 0, 1, 2, 3, 4, 5, 6 and 7.

Figure 11A:
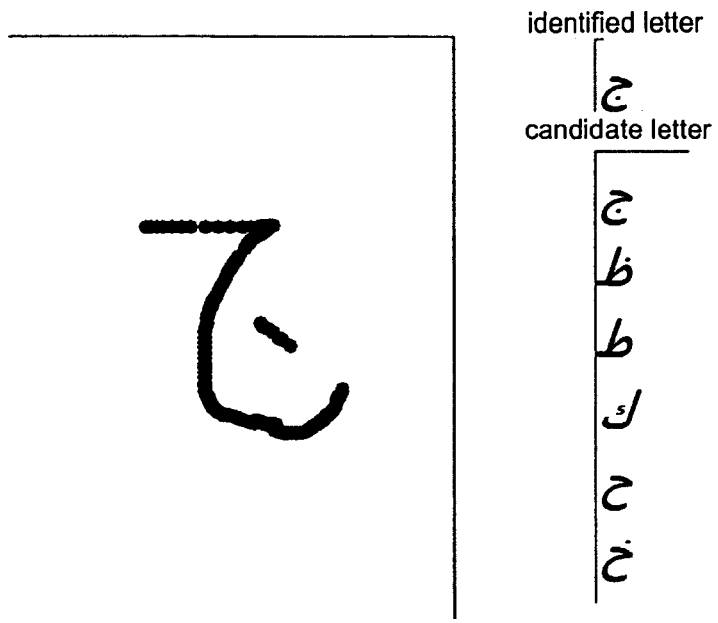
FIG. 11a is a schematic view illustrating an identifying result of an inputted hand-written Arabic letter by using identifying method of the present invention.
Figure 11B:
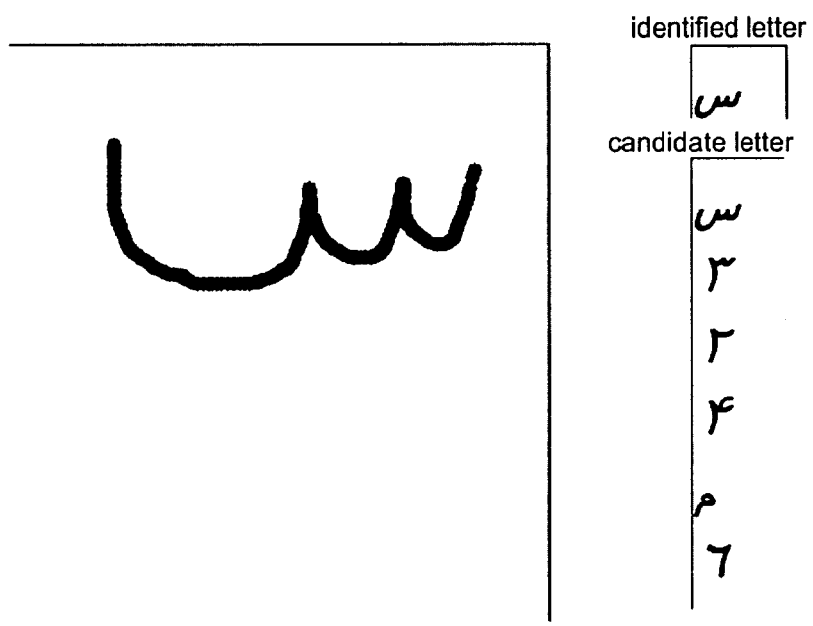
FIG. 11b is a schematic view illustrating an identifying result of another inputted hand-written Arabic letter by using identifying method of the present invention.

By identifying two hand-written Arabic letters according to the identifying method of the present invention, the identifying results are respectively shown in FIG. 11a and FIG. 11b. The left letter represents the inputted hand-written Arabic letter; the right lower letters represent the second candidate letter aggregation obtained from the multilayer coarse classification algorithm based on the local characteristic of Arabic letter; the right upper letter represents the final identifying result. The identifying precision of the present invention is higher, as shown in FIG. 11a and FIG. 11b.

What is claimed is:

1. An on-line identifying method of hand-written Arabic letters, comprising steps of:
   (a) collecting chirography coordinates of hand-written Arabic letters that are inputted in a terminal unit, and storing said chirography coordinates into a predefined structural array in real time;
   (b) preprocessing chirography coordinates and chirography coordinates lattice in a matrix format transformed from said chirography coordinates stored in a structural array;
   (c) by using multilayer coarse classification algorithm based on local characteristic of Arabic letter, according to shape characteristic of Arabic letters, classifying all standard Arabic letters into four categories, obtaining a first candidate letter aggregation matching with inputted hand-written Arabic letter according to stroke number of inputted hand-written Arabic letter, and obtaining a second candidate letter aggregation matching with inputted hand-written Arabic letter according to local characteristic of inputted hand-written Arabic letter and first candidate letter aggregation; and
   (d) extracting a freeman chain code of inputted hand-written Arabic letter, calculating a matching probability between said freeman chain code of inputted hand-written Arabic letter and an optimal Hidden Markov Models of each standard letter stored in a predetermined letter library and corresponding to each letter stored in the second candidate letter aggregation, obtaining an optimized matching probability from each matching probability, and determining that standard letter stored in a predetermined letter library and corresponding to an optimized matching probability as final identifying result of inputted hand-written Arabic letter.

2. The on-line identifying method of hand-written Arabic letter, as recited in claim 1, wherein step (b) comprises the following steps of:

(b.1) smoothly filtering said chirography coordinates stored in the structural array, removing hardware noise, and eliminating burr and broken line formed in writing process;

(b.2) linearly and nonlinearly normalizing said chirography coordinate point lattice in the matrix format transformed from said chirography coordinates processed in step (b.1) by using linear normalization and non-linear normalization algorithm of on-line single-point width hand-written style to obtain new chirography coordinate point lattice; and (b.3) adding points to said new chirography coordinate point lattice processed by step (b.2) to prevent from loosing effective characteristic point.

3. The on-line identifying method of hand-written Arabic letter, as recited in claim 2, wherein step (b.2) comprises steps of:

(b.2.1) linearly normalizing said chirography coordinate point lattice in the matrix format transformed from said chirography coordinates processed in step (b.1) to a standard coordinate point lattice by adopting coordinates frame scaling and direct projection method;

(b.2.2) expressing standard coordinate point of standard coordinate point lattice as (x, y), and classifying said standard coordinate point (x, y) into a chirography coordinate point and a non-chirography coordinate point;

(b.2.3) calculating a density function d(x, y) of said standard coordinate point (x, y), $$d(x, y) = \begin{cases} \text{Max}(A/Lx, A/Ly), & Lx + Ly \pi 6A \\ 0, & Lx + Ly \geq 6A \end{cases},$$

wherein, Lx is a transverse density of a current standard coordinate point, Ly is a vertical density of a current standard coordinate point, A is a length of said standard coordinate point lattice, and a value of A is 64;

(b.2.4) calculating a level density projection function H(x) and a vertical density projection function V(y) of said standard coordinate point (x, y) according to said density function d(x, y) of said standard coordinate point (x, y), $$H(x) = \sum_{y=1}^{J} [d(x, y) + a_H], V(y) = \sum_{x=1}^{I} [d(x, y) + a_v],$$

wherein, d(x, y) is said density function of said standard coordinate point (x, y), I×J is a dimension of said standard coordinate point lattice, a value of I×J is 64×64, $a_H$ and $a_v$ are correction coefficient, and both value of $a_H$ and $a_v$ are 0.1; and (b.2.5) non-linearly normalizing said chirography coordinate point lattice by using a level density projection function H(x) and a vertical density projection function V(y) to obtain a new chirography coordinate point lattice, $$m = \sum_{x=1}^{i} H(x) \times \frac{M}{\sum_{x=1}^{I} H(x)}, n = \sum_{y=1}^{j} V(y) \times \frac{N}{\sum_{y=1}^{J} V(y)},$$

wherein I×J is the dimension of said standard coordinate point lattice, the value of I×J is 64×64; M×N is a dimension of said new chirography coordinate point lattice processed by non-linear normalization algorithm, a predetermined value of M×N is 64×64 ; (m, n) is a coordinate point of said new chirography coordinate point lattice; i=1,2, . . . , I, j=1,2, . . . , J.

4. The on-line identifying method of hand-written Arabic letter, as recited in claim 1, wherein In step (c), said local characteristic comprises a stroke number of letter, a stroke segment number of letter, a vertical cross number of letter, a transverse cross number of letter, an existence of the point stroke in letter, the number of point stroke and a position of said point stroke.

5. The on-line identifying method of hand-written Arabic letter, as recited in claim 4, wherein step (c) comprises the following steps of:

(c.1) classifying all standard Arabic letter into four categories, case1, case2, case3 and case4, wherein case1 comprises letters of one stroke, case2 comprises letters of two strokes, case3 comprises letters of three strokes, and case4 comprises letters of four strokes, and directly obtaining a first candidate letter aggregation matching with inputted hand-written Arabic letter according to stroke number of inputted hand-written Arabic letter;

(c.2) when the first candidate letter aggregation fits into case1, segmenting the inputted hand-written Arabic; when the stroke segment number is 1, obtaining a second candidate letter aggregation matching with the inputted hand-written Arabic letter; when the stroke segment number is more than 1, calculating the vertical cross number of the inputted hand-written Arabic letter; when S=1 or S=2, calculating the transverse cross number H of the inputted hand-written Arabic letter, and obtaining the second candidate letter aggregation matching with the inputted hand-written Arabic letter according to the transverse cross number H; when S=3, obtaining the second candidate letter aggregation matching with the inputted hand-written Arabic letter according to a direction of last stroke of the inputted hand-written Arabic letter; when S=4, directly obtaining the second candidate letter aggregation matching with the inputted hand-written Arabic letter; when the first candidate letter aggregation fits into case2, judging whether the point stroke exists in the inputted hand-written Arabic letter; wherein if the point stroke exists, when point stroke number is 1, according to the position of the point stroke located on upside, downside and inner side of the inputted hand-written Arabic letter, respectively obtaining the second candidate letter aggregation matching with the inputted hand-written Arabic letter; when the point stroke number is 2, directly obtaining the second candidate letter aggregation matching with the inputted hand-written Arabic letter; if the point stroke number does not exist, according to whether the inputted hand-written Arabic letter is an up-down structure, respectively obtaining the second candidate letter aggregation matching with the inputted hand-written Arabic letter; when the first candidate letter aggregation fits into case3, judging whether the head of the strokes except point stroke connects its tail of the inputted hand-written Arabic letter, if head connects to tail, directly obtaining the second candidate letter aggregation matching with the inputted hand-written Arabic letter; if head does not connect to tail, judging the position of point stroke; if the point stroke is above the inputted hand-written Arabic letter, calculating the vertical cross number S of the inputted hand-written Arabic letter; when S=1 or S=2, calculating the transverse cross number H of the inputted hand-written Arabic letter, and obtaining the second candidate letter aggregation matching with the inputted hand-written Arabic letter according to the transverse cross number H; when S=3, obtaining the second candidate letter aggregation matching with the inputted hand-written Arabic letter according to the direction of the last stroke of the inputted hand-written Arabic letter; when S=4, directly obtaining the second candidate letter aggregation matching with the inputted hand-written Arabic letter; if the point stock is under the inputted hand-written Arabic letter, directly obtaining the second candidate letter aggregation matching with the inputted hand-written Arabic letter; when the first candidate letter aggregation fits into case4, calculating the transverse cross number H of the strokes except the point stroke in the inputted hand-written Arabic letter; when the transverse cross number H is more than or equal to 3, directly obtaining the second candidate letter aggregation matching with the inputted hand-written Arabic letter; when the transverse cross number H is less than 3, directly obtain the second candidate letter aggregation matching with the inputted hand-written Arabic letter.

6. The on-line identifying method of hand-written Arabic letter, as recited in claim 5, wherein the segmenting process in step (c.2) comprises steps of defining the new chirography coordinate point representing a beginning of a first stroke of the inputted hand-written Arabic letter in the new chirography coordinate point lattice processed by step (c) as a current chirography coordinate point; judging whether an angle between the current chirography coordinate point and a new chirography coordinate points next to the current chirography coordinate point is larger than a predetermined threshold value, wherein when the angle is larger than the predetermined threshold value, the current chirography coordinate point is a preliminary turning point; processing the next new chirography coordinate point in a same manner to obtain all preliminary turning points; defining all processed preliminary turning points of all preliminary turning points as current preliminary turning points, and deleting a preliminary turning point closer to the current preliminary turning point between two preliminary turning points adjacent to the current preliminary turning point; obtaining all optimized turning points until all preliminary turning points are processed; segmenting the inputted hand-written Arabic letter according to the optimized turning points to obtain the stroke segments.

7. The on-line identifying method of hand-written Arabic letter, as recited in claim 6, wherein step (d) comprises the following steps of: (d.1) extracting the freeman chain code of the inputted hand-written Arabic letter; (d.2) calculating the matching probability between the freeman chain code of the inputted hand-written Arabic letter and the optimal Hidden Markov Models of each standard letter stored in a predetermined letter library and corresponding to each letter stored in the second candidate letter aggregation by using Viterbi Algorithm; (d.3) obtaining the maximum matching probability by sequencing each matching probability by using public Bubble Sort Algorithm; (d.4) determining the standard letter stored in the predetermined letter library and corresponding to the optimized matching probability as the final identifying result of Arabic letter.

* * * * *